T. C. DELAPLANE.
Flour Mill.
No. 167,995. Patented Sept. 21, 1875.
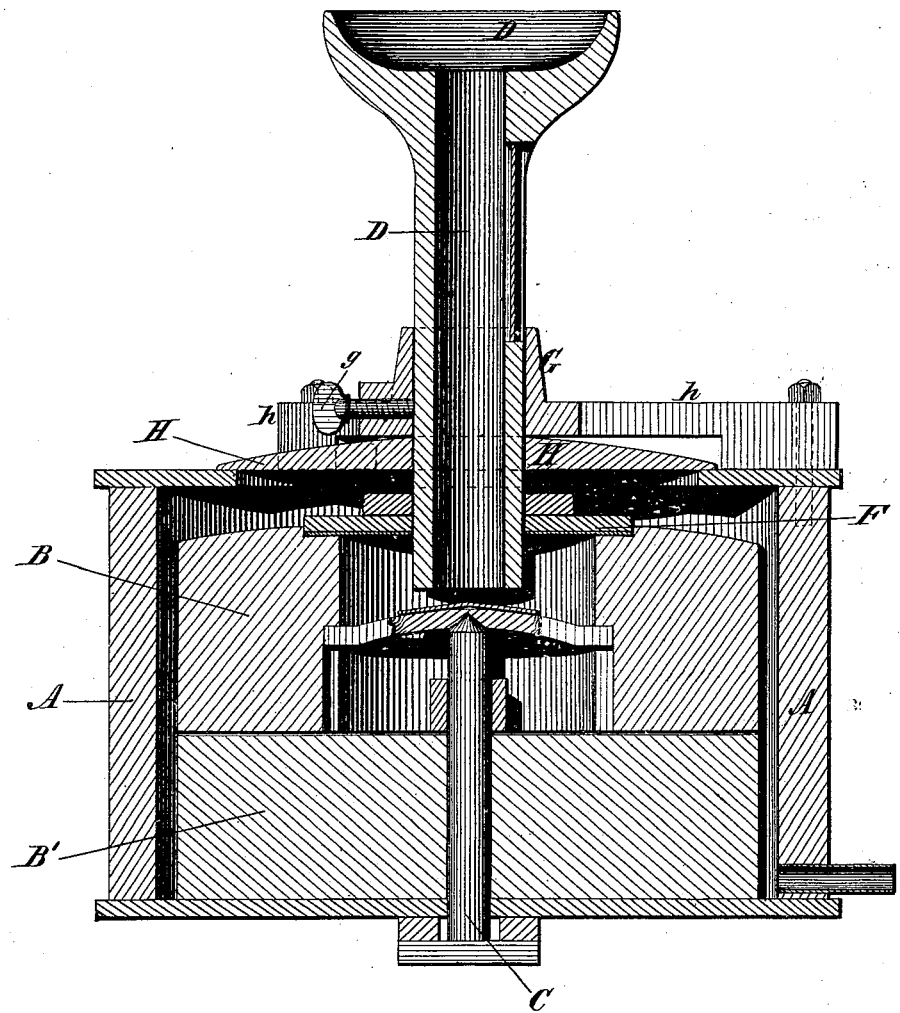
WITNESSES  
Harry King  
H. H. Young
Theo: C. Delaplane. INVENTOR
By his Attorney
W. D. Baldwin

UNITED STATES PATENT OFFICE.

THEODORE C. DELAPLANE, OF FREDERICK, MARYLAND, ASSIGNOR OF ONE-HALF HIS RIGHT TO HENRY N. ETCHISON, OF SAME PLACE.

IMPROVEMENT IN FLOUR-MILLS.

Specification forming part of Letters Patent No. 167,995, dated September 21, 1875; application filed April 7, 1875.

*To all whom it may concern:*

Be it known that I, THEODORE C. DELAPLANE, of Frederick city and county, in the State of Maryland, have invented or discovered a new and useful Improvement in the Art of Milling Flour, &c., of which the following is a specification:

In milling apparatus, as heretofore constructed, so far as I am aware, it has been usual to allow air to enter the eye of the stone and circulate freely between and around the burrs for the purpose, as was supposed, of cooling them while in operation, and thus to produce a better quality of flour or meal.

My invention is based on the discovery that by excluding the air from the burrs they will keep cooler, grind better, produce a decidedly superior and more nutritious quality of flour or meal, and that more flour can be obtained from the same quantity of grain than when the grain is ground by the ordinary grinding-mills, in which air is admitted to the burrs.

My invention, therefore, has for its object an improved production of flour and meal; and it consists in sealing the burrs of a grinding-mill, while grinding, for the purpose of excluding air, which object is preferably attained by means of packing.

The accompanying drawing represents a vertical central section through so much of a milling apparatus as is necessary to illustrate my invention.

A tight casing, A, surrounds the burrs B B′, one of which, the lower one in this instance, is shown as being driven by a shaft or spindle, C, in the usual manner. A hollow feed-spout or tube, D, through which the grain to be ground is fed to the burrs, is held in a suitable support, G. This tube or spout projects into the eye formed in the upper burr B, which, in ordinary grinding-mills, forms the open feed-chamber, and the distance it extends into the said eye is rendered variable by means of the set-screw $g$, or its equivalent.

This tube or feed-spout, which may be of any desired length and capacity, and which may be provided with an indicator to show how much grain is being ground, is surrounded by a packing collar or collars, F, at the point where it enters the said eye of the burr B, which packing lies upon or flush with the top surface of said burr for the purpose of entirely excluding the air.

I have found these collars F in practice to serve a very good purpose; but I also prefer to close the casing A by a cap or cover, H, held down to its seat on the casing by means of the arms $h$ of the tube-support G, which is firmly secured to the casing by set-screws, or other equivalent means. This cap effectually prevents access of air to the burrs.

In operation the feed-tube is filled with grain, which, of itself, excludes air from passing down through it, though, if necessary, I propose to feed the grain from an air-tight hopper.

Practical working has demonstrated that, by thus entirely excluding the air during the grinding operation, a better quality of flour, and more of it, can be produced than can be made from a given quality and quantity of grain by the ordinary old method of admitting air to the burrs.

The passage through the outlet-pipe of the ground flour will effectually prevent air from entering the casing at that point, or a weighted valve of well-known construction would answer that purpose.

I claim as of my own invention—

1. The improvement in the art of milling, hereinbefore set forth, which consists in sealing the burrs while grinding, for the purpose of excluding air.

2. The combination, substantially as hereinbefore set forth, of the burrs, the feed-tube, and a packing encircling the tube and covering the eye of the burr, to exclude air therefrom while grinding.

3. The combination, substantially as hereinbefore set forth, of the casing-burrs inclosed therein, a tube through which the grain is fed to the burrs, and a cap or cover which seals the casing and excludes air from the burrs while grinding.

4. The grinding apparatus, hereinbefore set forth, consisting of the combination of the burrs, a casing surrounding the burrs, packing covering the eye of the burr, a cover for the casing, and a feed-spout passing through the cover and packing, for the purposes set forth.

In testimony whereof I have hereunto subscribed my name.

THEODORE CRIST DELAPLANE.

Witnesses:
JACOB BYERLY,
JOS. B. GARROTT.